United States Patent [19]

Sato

[11] Patent Number: 4,686,690
[45] Date of Patent: Aug. 11, 1987

[54] SYNCHRONOUS DATA RECEIVER CIRCUIT

[75] Inventor: Osamu Sato, Tokyo, Japan

[73] Assignee: NEC Corporation, Tokyo, Japan

[21] Appl. No.: 746,700

[22] Filed: Jun. 20, 1985

[30] Foreign Application Priority Data

Jun. 22, 1984 [JP] Japan .................. 59-127313

[51] Int. Cl.$^4$ .......................................... H04L 7/08
[52] U.S. Cl. .................... 375/114; 375/116; 375/118; 371/47
[58] Field of Search ............... 375/108, 114, 116, 118, 375/88; 370/105, 108, 100; 371/5, 47–51

[56] References Cited

U.S. PATENT DOCUMENTS 4,187,394 2/1980 Sievers ............................ 375/114
4,225,960 9/1980 Masters ........................... 371/47
4,507,779 3/1985 Barner, Jr. et al. ............. 370/100

OTHER PUBLICATIONS

"Recurrent Codes: Easily Mechanized Burst-Correcting, Binary Codes" Hazelbarzer, *B.S.T.J.*, Jul. 1959.

Primary Examiner—Robert L. Griffin
Assistant Examiner—M. Huseman
Attorney, Agent, or Firm—Sughrue, Mion, Zinn, Macpeak and Seas

[57] ABSTRACT

The synchronous data receiver circuit, after temporarily storing received data in a data memory having a large enough capacity to store at least two frames, detects a frame synchronization signal pattern with a pattern match circuit, then stores the message data alone of the received data in a data buffer, detects errors with a decoder and checks whether the detected frame synchronization signal pattern is the correct pattern of the frame synchronization signal or a wrong frame synchronization signal pattern contained in the message data. If it is the correct frame synchronization signal, the message data is sent to a data processing unit at the next stage or, if it is a wrong frame synchronization signal pattern, the frame synchronization signal pattern is checked again from the next data on.

7 Claims, 9 Drawing Figures

SYNCHRONOUS DATA RECEIVER CIRCUIT

BACKGROUND OF THE INVENTION

The present invention relates to a synchronous data receiver circuit, and more particularly to a synchronous data receiver circuit for use in mobile units for automobile telephone system or the like.

In the automobile telephone system, control signals which follow a frame synchronization signal are transmitted from a base station to mobile units or stations. The mobile unit which will be described in detail later, establishes the frame synchronization in response to the frame synchronization signal, and then receives message data representative of the control signals. A conventional synchronous receiving unit which will be also described later, includes a pattern match circuit for detecting a frame synchronization signal pattern on a bit-by-bit basis, a data buffer for receiving the message data, and a switch for selectively supplying an input signal to either the pattern match circuit or the data buffer. The switch is connected to the pattern match circuit before the establishment of the frame synchronization, and after the synchronization has been established, it is connected to the data buffer to receive the message data. If the message data accidentally include the frame synchronization signal pattern, the pattern match circuit erroneously detects a pattern in the message data as the frame synchronization signal pattern, making it impossible to correctly receive the message data.

SUMMARY OF THE INVENTION

An object of the present invention, therefore, is to provide a simply structured synchronous data receiver circuit which can handle any type of frame synchronization signal and, even if exactly the same signal pattern as that of the frame synchronization signal is contained in the message data, can prevent erroneous operation without fail.

According to the present invention, there is provided a synchronous data receiver circuit comprising serial/parallel converter means for converting serial data into parallel data; data memory means for storing at least two frames of the parallel data supplied from the serial/parallel converter means; pattern matching detector means for matching the patterns of the data stored in the data memory means and of a frame synchronization signal; data buffer means for storing, as message data, data of a prescribed bit length after the data detected as the frame synchronization signal by the pattern matching detector means; decoder means for detecting errors in the message data stored in the data buffer means; and control means for supplying, when the number of errors detected by the decoder means is smaller than a prescribed number, the message data stored in the data buffer means to a data processing circuit at a later stage or, when the number of errors detected by the decoder means is equal to or greater than the prescribed number, causing pattern matching to be performed again beginning with the data next to the frame synchronization signal earlier detected by the pattern matching detector means.

BRIEF DESCRIPTION OF THE DRAWINGS

Other features, advantages and objects of the present invention will be made more apparent by the detailed description hereunder taken in conjunction with the accompanying drawings, wherein.

DETAILED DESCRIPTION OF THE INVENTION

Figure 1:
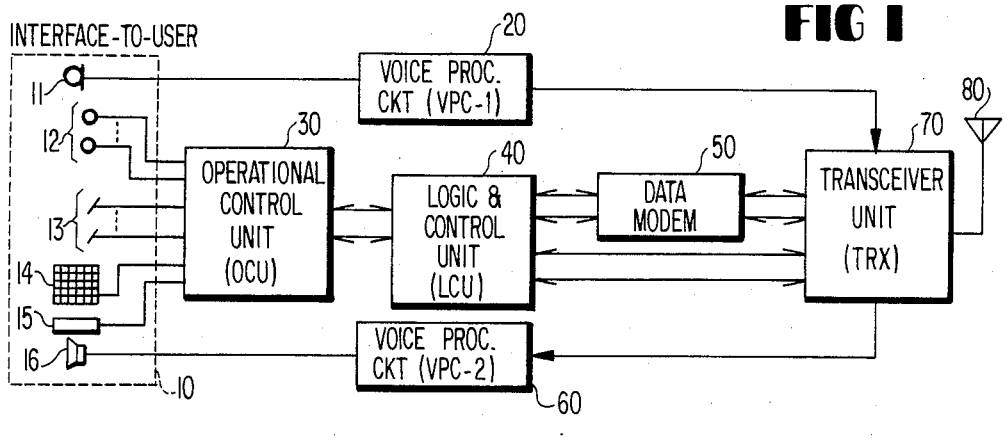
FIG. 1 is a block diagram illustrating the structure of a mobile unit for automobile telephone system to which the present invention is applicable.

In FIG. 1, the mobile unit comprises an interface-to-user section 10; a voice processing circuit (VPC-1) 20 for processing voice signals entered through a microphone 11 provided in the interface section 10; indicators 12 also provided in the interface section 10; hook switch-buttons 13; an operational control unit (OCU) 30 to which are connected a push button set 14 and a display 15; a logic and control unit (LCU) 40; a data modem 50 to which the LCU 40 is connected; a voice processing circuit (VPC-2) 60 connected to a speaker 16 provided in the interface section 10; a transceiver unit (TRX) 70 connected to the VPC-1 20, the data modem 50, the LCU 40 and the VPC-2 60; and an antenna 80 for enabling the TRX 70 to transmit and receive radio carrier waves.

The exchange of message data and voice signals between an automobile telephone mobile unit composed as described above and a base station is accomplished by the use of radio carrier waves. The message data may represent control signals for the mobile telephone system.

The antenna 80 picks up a radio carrier wave which includes the message data and is transmitted from the base station (not shown) The carrier wave is demodulated with the TRX 70 to provide a sub-carrier wave which is frequency-shift-keying (FSK) modulated with the message data and is within a voice frequency band, i.e., around 30 to 3,000 Hz. The data modem 50 demodulates the subcarrier wave to provide binary data to the LCU 40, which then analyzes the data. If it is necessary to actuate the indicators 12 and/or the display 15 as a result of the analysis of the data, the LCU 40 will give a proper command to the OCU 30, which drives and controls the pertinent units according to the command.

Conversely, to transmit a data from the mobile unit to the base station, a signal originating from the user's operation of the hook switch-buttons 13 and the push button set 14 is conveyed via the OCU 30 to the LCU 40, which gives a command to the TRX 70 to actuate the transmitter, so that the data to be sent is given to the data modem 50. The data modem FSK modulates a sub-carrier wave with the data from the LCU 40 and then supplies the FSK-modulated sub-carrier wave to the TRX 70. The TRX 70 frequency modulates a radio carrier wave with the sub-carrier and transmits the FM carrier wave via the antenna 80 to the base station.

Meanwhile, when a conversation takes place, voice signals are transmitted and received between the mobile unit and the base station. In this process, the VPC-1 20 and the VPC-2 60 are so controlled by the LCU 40 as to be electrically connected to the TRX 70. A voice signal entered by the user of the mobile unit through the microphone 11 is given to the VPC-1 20, whose output is frequency modulated by the TRX 70 and transmitted to the base station through the antenna 80.

The carrier wave modulated with a voice signal from the base station is picked up by the antenna 80 and received by the TRX 70, whose output, an audio signal, is supplied to the VPC-2 60. The VPC-2 60 amplifies the signal and drives the speaker 16 to deliver the audio signal.

The function of the VPC-1 20 is to amplify and preemphasize signals from the microphone 11. That of the VPC-2 60 is to deemphasize the signals, filter them to remove undesired signal and drive the speaker 16.

The LCU 40 controls the TRX 70, the OCU 30 and so forth when a call is initiated from the mobile unit, a call arrives from the base station, roaming up-date takes place or the channel is switched.

Figure 2:
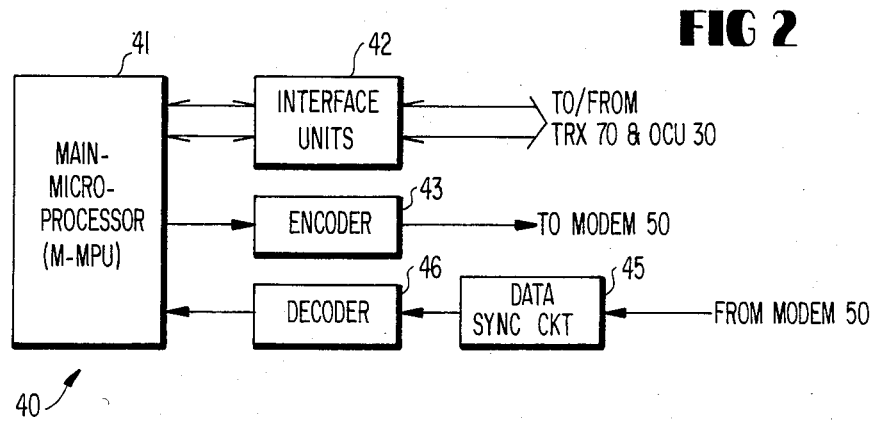
FIG. 2 is a block diagram illustrating the logic and control unit shown in FIG. 1 in further detail.

FIG. 2 is a block diagram illustrating the LCU 40 in further detail. The LCU 40 comprises a main-microprocessor (M-MPU) 41; interface units 42 for connecting the M-MPU 41 to the TRX 70 and the OCU 30; an encoder 43 for encoding data supplied from the M-MPU 41 to the data modem 50; a data synchronizer circuit 45 into which signals are entered from the data modem 50; and a decoder 46 for decoding output signals from the data synchronizer circuit 45 and enter them into the M-MPU 41.

Figure 3:
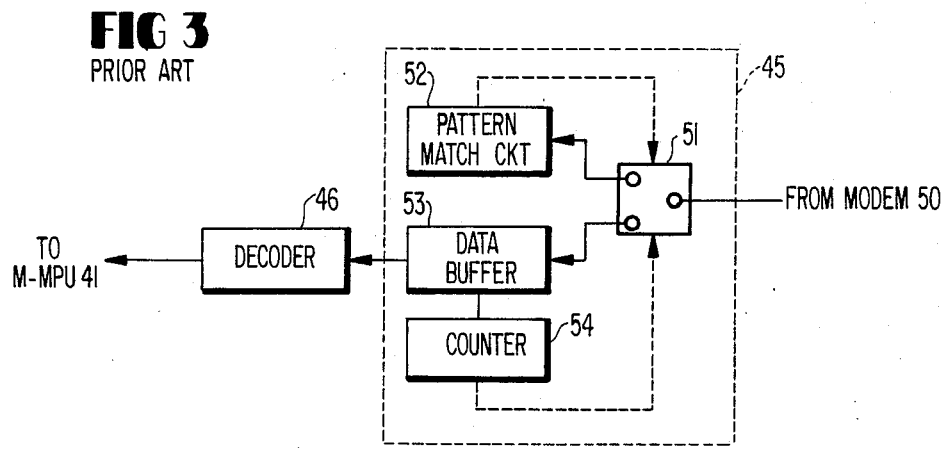
FIG. 3 is a block diagram illustrating the structure of a synchronous data receiver circuit of the prior art.

In FIG. 3, a synchronous data receiver circuit of the prior art, used as the data synchronizer circuit 45 in the LCU 40, comprises a switch 51 for switching the destination of signals supplied from the data modem 50; a pattern match circuit 52 connected to one of the fixed contact terminals of the switch 51; a data buffer 53, connected to the other fixed contact terminal of the switch 51, for supplying output signals to the decoder 46; and a counter 54, whose input is the output of the data buffer 53, for counting the number of bits in the message data.

Figure 4:
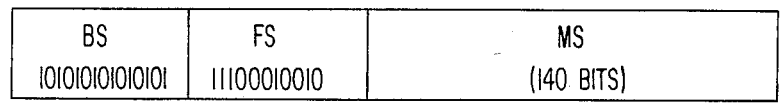
FIG. 4 is a diagram of data composition for a frame.

One frame of synchronization serial data entered from the data modem 50 into the data synchronizer circuit 45, as shown in FIG. 4, consists of three segments, a bit synchronization signal BS, a frame synchronization signal FS and a message data MS. When frames are consecutively transmitted or in wire communication, the bit synchronization signal BS may be dispensed with. To extract the message data MS out of these serial data, the data have to be received in synchronization with the frames, and for this purpose the frame synchronization signal has to be detected.

As the bit synchronization signal BS and the frame synchronization signal FS are used, for instance, 15-bit '101010101010101' and 11-bit '11100010010', known as the Barker Sequence. There are 140 bits of the message data MS per frame, encoded in the so-called Hagelbarger code.

Further, the encoder 43 (FIG. 2) and the decoder 46 may be those disclosed in "Recurrent Codes: Easily Mechanized Burst Correcting, Binary Codes", The Bell System Technical Journal 38, pp. 969–984, July 1959.

In a synchronous data receiver circuit of the prior art structured in this manner, at first the switch 51 is on toward the pattern match circuit 52, and every time a bit of the data to be received comes in, its pattern matching is checked. If a signal identical with the frame synchronization signal FS is detected, an output signal from the pattern match circuit 52 will turn over the switch 52 toward the data buffer 53, and the next and following bits are successively stored in the data buffer 53 as message data. At this time, the counter 54 functions to increase its count by one every time a bit of data is stored in the data buffer 53. When the counter 54 has finished counting the number of bits (140) of the message data MS per frame, the switch 51 returns toward the pattern match circuit 52. Accordingly, only the message data MS are stored in the data buffer 53. The message data MS stored in the data buffer 53 are decoded by the decoder 46 and entered into the microprocessor 41.

As mentioned earlier, pattern matching may occur elsewhere than the frame synchronization signal FS for a particular frame. For example, an identical pattern (see the parts marked with oblique lines in FIG. 5) with that of the frame synchronization signal FS may be contained in the message data MS. Otherwise, the frame synchronization signal FS may be prevented by noise from being detected. In such a situation, the pattern match circuit 52 erroneously detects the synchronization signal. Thus, the pattern match circuit 52 turns over the switch 51 in response to a wrong frame synchronization signal pattern and, therefore, wrong message data will be entered into the data buffer 53.

Figure 5:
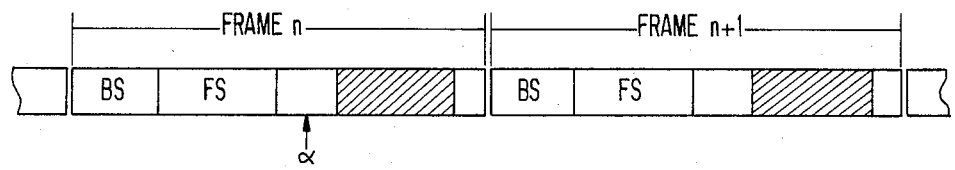
FIG. 5 is an illustrative diagram for describing the operation which takes place when a frame synchronization signal pattern, is contained in message data.

Thus, when a mobile unit shifts to a given channel from another and starts receiving data, if it uses the kind of prior art synchronous data receiver circuit illustrated in FIG. 3, and if its reception starts at a point of time α in a frame n as referred to in FIG. 5, it will detect the incorrect frame synchronization signal pattern contained in the message data MS and begin to receive the message data MS from then on. A similar phenomenon will also occur if exactly the same bit sequence as the frame synchronization signal FS happens to be contained in the message data MS or an error on the transmission path has changed a part of the message data MS into exactly the same bit sequence as the frame synchronization signal FS. Since a synchronous data receiver circuit of the prior art does not restart detection of the frame synchronization signal FS until the whole message data MS have been received, once the frame synchronization signal FS fails to be properly detected, no correct message data can be obtained at all even though frames are consecutively received.

Figure 6:
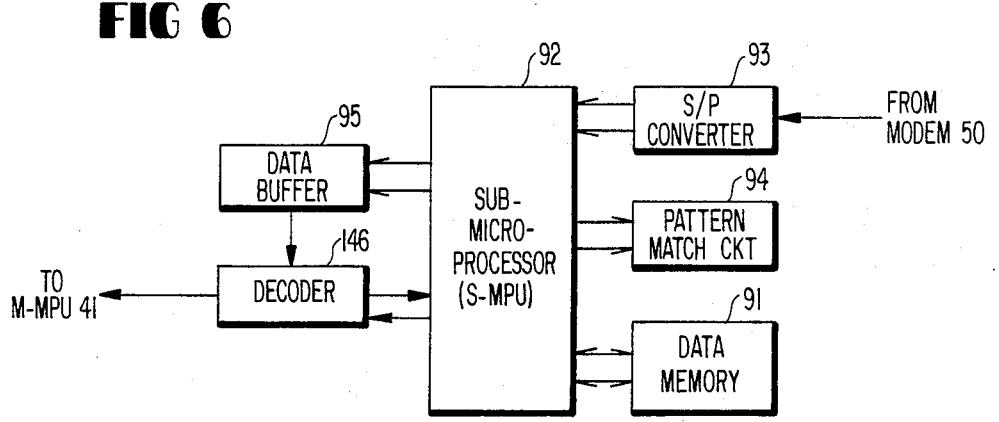
FIG. 6 is a block diagram illustrating the structure of a synchronous data receiver circuit which is a preferred embodiment of the present invention.

Referring to FIG. 6, a synchronous data receiver circuit which is a preferred embodiment of the present invention is shown. In FIG. 6, a data memory 91 is capable of storing at least two frames of received data. A sub-microprocessor (S-MPU) 92 controls data inputting to and outputting from the data memory 91. A serial/parallel converter circuit 93 converts serial signals supplied from the data modem 50 (FIG. 1) into parallel signals and supplies them to the S-MPU 92. A pattern match circuit 94 has access to the data memory 91 via the S-MPU 92 and checks pattern match between received data and a frame synchronization signal FS. A data buffer 95 stores data of a bit length corresponding to message data MS read out of the data memory 91 via the S-MPU 92.

Figure 9:
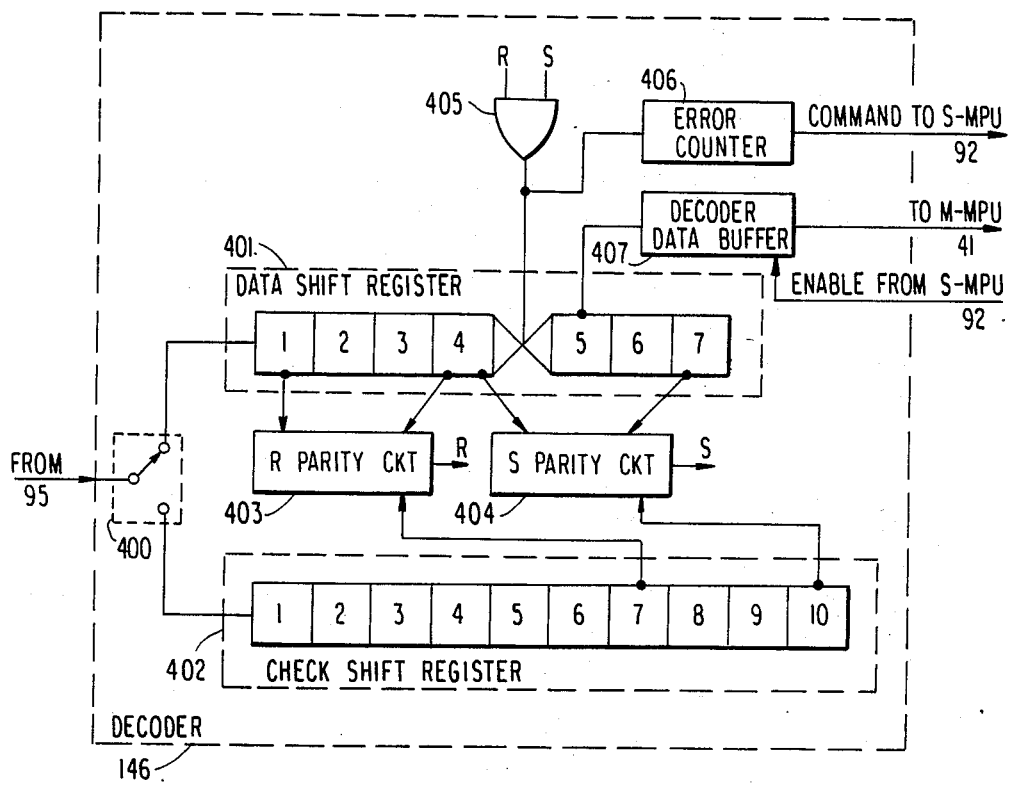
FIG. 9 is a block diagram illustrating the decoder in the synchronous data receiver circuit shown in FIG. 6.

FIG. 9 shows a decoder 146 which is identical to the conventional decoder 46 identified in FIG. 3 (and disclosed in detail in the previously referenced Bell Technical Journal Article at pages 970 and 971) except for the addition of an error counter 406 and a decoder data buffer 407. The message data from the data buffer 95 is supplied to a switch 400 where the alternating data and check digits are separated, the check digits going to a check shift register 402 and the data digits to a data shift register 401. The decoder 146 includes two copies of the parity circuits 403 and 404, each one checking the parity relation imposed by an encoder.

The decoding rule is:

Whenever both the outputs R and S of parity circuits 403 and 404 fail, change the data digit in Position 4 of the data shift register 401 (0-1, 1-0) while shifting it to Position 5. If only one parity check fails, make no change.

The corrected data digits are available at Position 5 of data shift register 401 and stored in the decoded data buffer 407. The error counter 406 counts the output of an AND gate 405 to which the outputs R and S are supplied. That is, the error counter 406 counts errors in the message data from the data buffer 95. If the errors are fewer than a prescribed number, the error counter 406 produces no output. Under this state, S-MPU 92 supplies an enable signal to the decoded data buffer 407, so that the decoded data is outputted from buffer 407 to M-MPU 41.

If the errors are equal to or more than the prescribed number, the error counter 406 supplies a command signal to S-MPU 92. Upon receipt of the command signal, S-MPU 92 causes the pattern match circuit 94 to perform pattern matching again.

The storage capacity of the data memory 91 has to be at least large enough for two frames so that received data for a full frame can be stored therein. In this example, the capacity is 166×2=332 bits, which means that 42 bytes is sufficient where an eight-bit memory is used. The data memory 91 is freely accessible by means of the S-MPU 92, whose function may, as well, be concurrently performed by the M-MPU 41.

The serial/parallel (S/P) converter circuit 93 hands over parallel data to the S-MPU 92 as soon as eight bits of received data are ready. The S-MPU 92 stores the data of eight bits from the S/P converter circuit 93 in the data memory 91 while incrementing the address of the memory 91 by one.

The S-MPU 92 reads the received data out of the data memory 91 every time one of the following conditions is met:
 (a) pattern matched;
 (b) error detected; and
 (c) data supplied Pattern matching, referred to as (a), is a state in which the frame synchronization signal FS is being searched for by the pattern match circuit 94 in the received data stored in the data memory 91. Error detection, referred to as (b), is one in which errors in the message data MS are detected by the decoder 46 to determine whether or not the frame synchronization signal that has been found by the state (a) is correct, and the number of errors is counted. Data supply, referred to as (c), is one in which, the frame synchronization signal FS having been determined correct, the message data MS are decoded and supplied to the M-MPU 41. Transitions between these states (a) to (c) are illustrated in FIG. 7.

Figure 7:
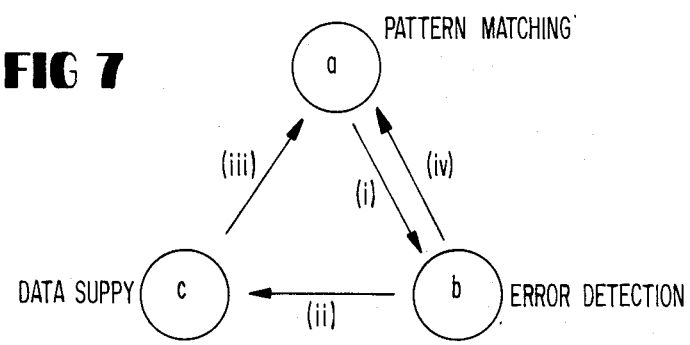
FIG. 7 is a transition diagram illustrating the transition of the operating mode of the synchronous data receiver circuit illustrated in FIG. 6.

As is evident from FIG. 7, there are four different ways of transition between the three states. The four ways are as follows:

(i) When a frame synchronization signal pattern has been found out of the received data stored in the memory data 91, transition takes place from the pattern matching state (a) to the error detection state (b).
 (ii) When the pattern so found is determined to be the genuine frame synchronization signal FS as a result of decoding the message data, transition takes place from the error detection state (b) to the data supply state (c).
 (iii) When the message data MS in a prescribed number of bits have been supplied to the M-MPU 41, transition takes place from the data supply state (c) to the pattern matching state (a).
 (iv) When the pattern so found is determined not to be the genuine frame synchronization signal FS as a result of decoding the message data, transition takes place from the error detection state (b) to the pattern matching state (a).

In the synchronous data receiver circuit according to the present invention, the fourth way (iv) of transition makes it possible to prevent a wrong frame synchronization signal pattern from inviting the reception of wrong message data.

Figure 8:
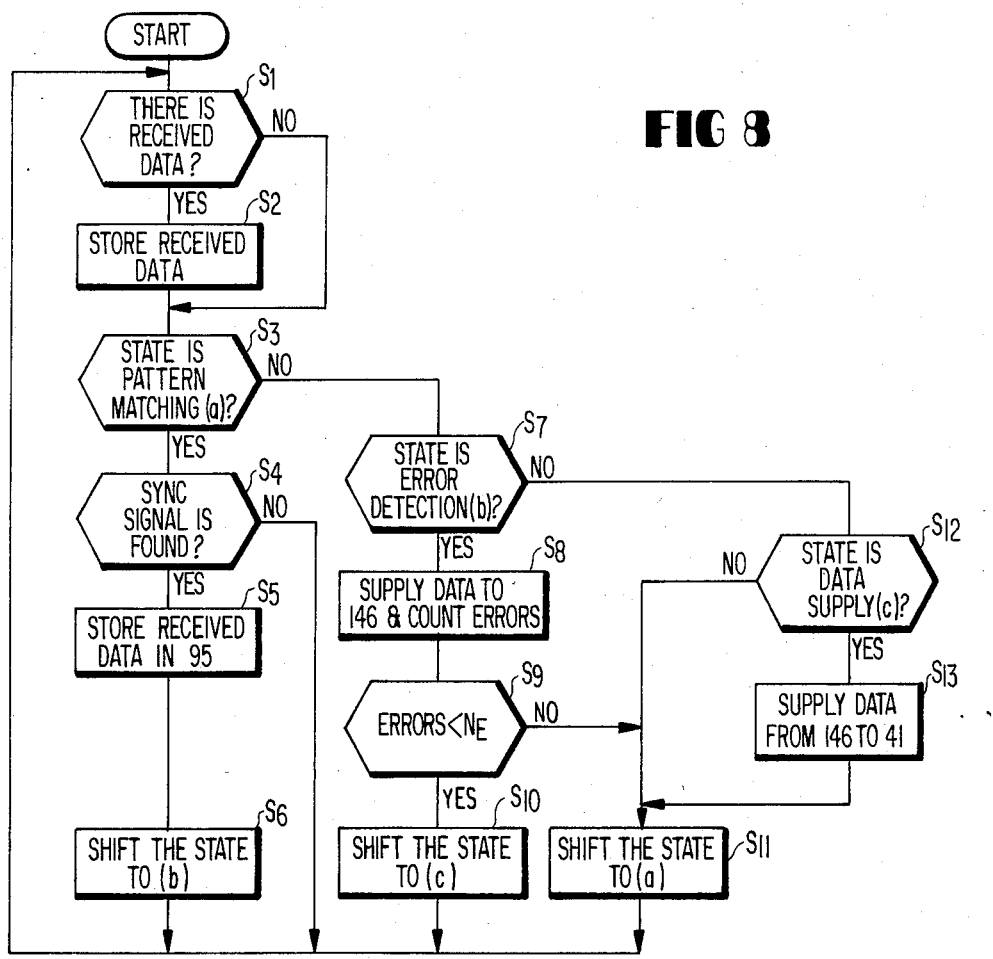
FIG. 8 is a flow chart illustrating the operation of the synchronous data receiver circuit illustrated in FIG. 6.

When this synchronous data receiver circuit is in operation, serial data signals entered from the data modem 50 into the S/P converter circuit 93 are successively shifted by this circuit 93 and converted into eight-bit parallel signals, which are supplied to the S-MPU 92. The S-MPU 92, as shown in the flow chart of FIG. 8, continuously checks the presence or absence of received data supplied from the S/P converter circuit 93 (Step S1). If there is any received data, the S-MPU 92, after storing the received data in the data memory 91, will increase the address pointer for the data memory 91 by one, and shifts to determination of whether or not the current state is pattern matching (Step S2). If the address pointer surpasses the highest address of the data memory 91, or data have once been written into the data memory 91, the address pointer will be initialized to the lowest address. Meanwhile, if the determination of the presence or absence of received data finds the absence of received data, no data will be stored in the data memory 91, and the S-MPU 92 will shift to the determination of whether or not the current state is pattern matching.

Next, in determining whether or not the current state is pattern matching, if the answer is affirmative, the received data will be read out of the data memory 91 to the pattern match circuit 94 via the S-MPU 92 to determine whether or not the frame synchronization signal has been found (Steps S3 and S4). Since the frame synchronization signal FS may be stored spanning the three highest addresses of the data memory 91, the S-MPU 92 reads out three bytes of data beginning from two addresses before the one indicated by the address pointer for the pattern match circuit 94, and successively checks match with the frame synchronization signal pattern while shifting the address by one bit at a time. The S-MPU 92 is continuously monitoring agreement between the address pointer for the pattern matching detector circuit 94 and that for the data memory 91 and, when the former is about to surpass the latter, exercises control not to let the pattern match circuit 94 detect the frame synchronization signal FS.

If the determination of whether or not the frame synchronizing signal has been found is in the affirmative at Step S4, the S-MPU 92 will provide the data buffer 95 with the final bit information of the frame synchronization signal pattern detected by the pattern match circuit 94, and store in the data buffer 95 the received data in the prescribed number (140) of bits following the frame synchronization signal pattern as message data (Step S5). After Step S5, processing is done to shift the current state to one of error detection, and then the S-MPU 92 will return to the determination of the presence or absence of received data (Step S6). Alternatively, if the frame synchronization signal pattern is not found at Step S4, it directly returns to Step S1 to determine the presence or absence of received data.

If the current state is not one of pattern matching (Step S3), the S-MPU 92 will next shift to the determination of whether or not the current state is one of error detection (Step S7). If this determination is in the affirmative, it will mean that the frame synchronization signal pattern was found in the earlier determination of whether or not the frame synchronization signal has been found (Step S4), so that the message data will be supplied from the data buffer 95 to the decoder 146 to count the number of errors therein (Step S8).

Then, the S-MPU 92 will shift to the determination of whether or not the errors are fewer than the prescribed number $N_E$ (Step S9); if they are found smaller, it will judge that the correct frame synchronization signal has been detected, shift the current state to one of data supply, and return to the determination of the presence or absence of received data (Step S10). If the errors are more than the prescribed number, the S-MPU 92 will judge that a wrong frame synchronization signal pattern has been detected, shift the current state to one of pattern matching, and return to the determination of the presence or absence of received data (Step S11). Whereas the detection of the frame synchronization signal pattern is again performed in determining whether or not the frame synchronization signal has been found, the earlier detected wrong frame synchronization signal pattern will not be detected again because, at this time, the address pointer for the pattern match circuit 94 is incremented by one.

Besides the method of detecting the number of errors in the message data and determining the correctness of the frame synchronization signal on that basis, there can also be used another method by which a specific piece of information, for instance the line number or the apparatus number, is inserted in a specific position in the message data and the detection of the correct frame synchronization signal is determined if this piece of information is found in the message data.

If the current state is not one of error detection (Step S7), the S-MPU 92 will shift to Step S12 to determine whether or not it is one of data supply and, if it is not one of data supply, will return, after changing the current state to one of pattern matching to prevent erroneous operation, to Step S1 through Step S11 to check the presence or absence of received data. If, at Step S12, the current state is one of data supply, it will mean that the correct frame synchronization signal was detected in the earlier decision of whether or not the errors were fewer than the prescribed number (Step S9), and the message data stored in the data buffer 95 will be supplied to the main microprocessor 41 through the decoder 146 (Step S13). After Step S13, the S-MPU 92 will shift the current state to one of pattern matching, and return to the determination of the presence or absence of received data, via Step S11.

Although the preferred embodiment described above is an example in which the synchronous data receiver circuit according to the present invention is applied to a mobile unit for automobile telephone, obviously the invention can be applied to various other data receiver systems without any substantial change to the fundamental construction of the described system.

What is claimed is:

1. A synchronous data receiver circuit comprising:
    serial/parallel converter means for converting serial data, comprising at least frame synchronization data and message data, into parallel data;
    data memory means for storing at least two frames of the parallel data supplied from said serial/parallel converter means;
    pattern matching detector means for detecting in the patterns of the data stored in said data memory means a frame synchronization signal;
    data buffer means for storing, as message data, data of a prescribed bit length after the data detected as the frame synchronization signal by said pattern matching detector means;
    decoder means for detecting errors in the message data stored in said data buffer means; and
    control means for supplying, when the number of errors detected by said decoder means is smaller than a prescribed number, the message data stored in said data buffer means to a data processing circuit or, when the number of errors detected by said decoder means is equal to or greater than said prescribed number, causing pattern matching to be performed again beginning with the data next to the frame synchronization signal earlier detected by said pattern matching detector means.

2. A synchronous data receiver circuit, as claimed in claim 1, wherein said serial/parallel converter means converts said serial data into eight-bit parallel data.

3. A synchronous data receiver circuit, as claimed in claim 1, wherein said decoder means detects and corrects errors.

4. A synchronous data receiver circuit, as claimed in claim 1, wherein said control means is comprised of a microprocessor.

5. A synchronous data receiving method comprising the following steps:
    a. converting serial data into parallel data;
    b. storing said parallel data in data memory;
    c. detecting in the patterns of the data stored in the data memory a frame synchronization signal;
    d. storing in a data buffer, as message data, data of a prescribed bit length after the patterns of data are matched with the frame synchronization signal;
    e. detecting errors in the message data stored in the data buffer;
    f. supplying, when the number of errors detected is smaller than a prescribed number, the message data stored in the data buffer for data processing at a later stage; and
    g. causing, when the number of errors detected is equal to or greater than said prescribed number, pattern matching to be performed again beginning with the data next to the frame synchronization signal earlier detected.

6. A synchronous data receiving method, as claimed in claim 5, wherein said serial data are converted into eight-bit parallel data.

7. A synchronous data receiving method, as claimed in claim 5, wherein at said error detectin step errors are also corrected.

* * * * *